Patented May 23, 1950

2,508,717

UNITED STATES PATENT OFFICE 2,508,717

ALKYLOLAMIDES OF THE ACRYLIC ACID SERIES AND THEIR POLYMERS

Giffin D. Jones, Easton, Pa., assignor to General Aniline & Film Corporation, New York, N. Y., a corporation of Delaware No Drawing. Application October 16, 1945,
Serial No. 622,701

8 Claims. (Cl. 260—89.7)

This invention relates to amides of acids of the acrylic acid series and their polymers. More particularly, the invention relates to new monomeric complexes of N-di-substituted amides of acrylic and α-substituted acrylic acids and to the new polymers obtained therefrom.

N-dialkyl-α-substituted acrylamides do not polymerize under ordinary conditions of light, heat, or peroxide catalysis. As pointed out in U. S. Patent 2,311,548, granted to Jacobson et al., in order to polymerize acrylic acid amides which are substituted in the α-position, it is necessary that the amide must have one hydrogen atom on the nitrogen. While N-dialkylmethacrylamides as, for example, N-diethylmethacrylamide, may be interpolymerized with methyl methacrylate, the N-dialkyl α-substituted acrylamides alone have not heretofore been successfully polymerized.

It is among the objects of my invention to provide new monomeric complexes of N-disubstituted α-substituted acrylamides which are readily polymerizable.

It is among the further objects of my invention to provide a highly effective process for polymerizing N-disubstituted-α-substituted acrylamides.

It is a further object of my invention to provide a method for polymerizing N-dialkylamide monomers and monomers containing an amino or substituted amino group.

A more particular object of my invention is to provide a method for polymerizing N-methyl-N-β-ethanolmethacrylamide and N-diethylmethacrylamide.

According to my invention, the above objects are accomplished by reacting the α-substituted N-disubstituted acrylamides with an "electron acceptor" to form a monomer-electron acceptor complex and then polymerizing the monomer-complex. By the term "electron acceptor," I mean Friedel-Crafts halides (i. e., inorganic halides which promote Friedel-Crafts condensation reactions) as, for example, boron trifluoride, boron trichloride, tin, zinc, antimony, mercury, iron and aluminum chlorides. These halides form complexes with the N-di-substituted acrylamides which can be readily polymerized. If desired, after treatment of the acrylamide monomer with the Friedel-Crafts halide, the polymerization may be readily carried out by means of an oxygen catalyst, such as, for example, potassium persulfate or catalyzed by irradiation with ultra-violet light. Polymerization may be also carried out by heating the monomer-halide complex with a catalyst, such as an organic peroxide, for example, benzoyl peroxide, diethyl peroxide, or an ozonide. However, by employing the electron acceptor in excess, the use of other catalysts or ultra-violet light may be eliminated.

If desired, the treatment of the monomer with the Friedel-Crafts halide may be carried out in the presence of a suitable solvent, such as methylene chloride or chloroform. However, the presence of the solvent is not necessary since polymerization occurs in its absence, but it is desirable to use the solvent for its solvent action.

A preferred embodiment of my invention involves the use of boron trifluoride in the form of an etherate, which may be represented by the formula $BF_3.(C_2H_5)_2O$, as the electron acceptor. This may be used in any amounts but only that portion of the monomer converted to the complex polymerizes and the electron acceptor does not function as a catalyst for polymerization except when used in an amount in excess of the amount required to react with all the monomer to form the complex. Accordingly, it is preferred to use the Friedel-Crafts halide in at least an equimolecular amount with the monomer being polymerized. It is, however, particularly advantageous to employ the boron trifluoride in slight excess of the equimolecular amount since the use of ultra-violet light or catalysts for polymerization is then not required. In this case the excess of boron trifluoride acts as a catalyst to facilitate formation of the polymer. When equimolecular quantities of the Friedel-Crafts halide are utilized, it is preferable to add a small amount of a catalyst, such as benzoyl peroxide or an ozonide, to carry out the polymerization. Instead of the use of such a catalyst, ultra-violet light may be utilized for the same purpose.

While my process is particularly effective in the polymerization of N-disubstituted α-substituted acrylamides, it is also highly effective for polymerizing any acrylamide which is difficult to polymerize by any of the well known polymerization methods. Thus, it is highly effective in polymerizing N-methyl - N - β - ethanolacrylamide, which though having a hydrogen in the α-position, does not polymerize very readily when using the conventional methods as, for example, ultra-violet light or heat or the usual oxygen-containing catalysts. My invention also finds use in polymerizing monomers containing an amino or N-substituted amino group.

The following attempts were made to polymerize N-methyl-N-β-ethanolmethacrylamide by conventional methods:

a. 25 parts of the monomer were dissolved in 100 parts of water and subjected to ultra-violet light while a stream of nitrogen was bubbled through the solution. After a week, there was no polymerization. 0.1 part of benzoyl peroxide was added to the solution and the solution heated to 100° C. After a week of such treatment, there was still no polymerization.

b. The monomer was sealed in an evacuated tube and subjected to ultra-violet light. After two weeks of such treatment, no polymerization occurred.

c. A portion of the monomer was distilled at 0.5 mm. pressure and subjected to ultra-violet light. After a month, no polymerization had occurred.

d. 5 parts of the monomer were sealed in an evacuated tube containing 0.05 part of benzoyl peroxide and subjected to ultra-violet light. The material became yellow but had not polymerized after three weeks.

e. 1.23 parts of the monomer were dissolved in 10 parts of water, treated with 0.5 part of glacial acetic acid and 0.1 part of benzoyl peroxide and then heated under a current of hydrogen at 100° C. No polymer had formed after a week.

f. The same procedure as in examples a-f when carried out on N-diethylmethacrylamide failed to produce a polymer from this compound.

However, following the procedure of my invention, N-disubstituted - α - substituted acrylamides are readily polymerized as illustrated by the following examples in which the parts are by weight unless otherwise indicated.

Example 1

A portion of N-methyl-N-$\beta$-ethanolmethacrylamide was treated with an equimolecular quantity of boron trifluoride etherate and an equal volume of methylene chloride. The monomer boron trifluoride complex which formed was subjected to ultra-violet light at room temperature. After irradiation with ultra-violet light for a week, a polymer was obtained in good yield as a white solid on washing with acetone.

Example 2

2.20 parts of N-diethylmethacrylamide were treated with 2.75 parts of boron trifluoride etherate and 7.1 parts of methylene chloride and the solution placed under ultra-violet light at room temperature. After four days, considerable polymer was obtained in the form of a white precipitate.

Example 3

A portion of N-methyl-N-$\beta$-ethanolmethacrylamide was treated with an equimolecular quantity of boron trifluoride etherate and the mixture sealed in a glass tube and subjected to ultra-violet light. The treatment was carried out for about a week during which time a solid polymer was obtained.

Example 4

N-methyl-N-$\beta$-ethanolmethacrylamide was treated with a slight excess of boron trifluoride and permitted to stand. After a period of a week, a polymer in good yield was obtained.

Example 5

The same procedure was followed as in Example 2, but an equivalent amount of N-dipropylmethacrylamide monomer was utilized. A polymer in the form of a white powder was obtained. N-dibutylmethacrylamide was polymerized in the same manner.

Example 6

3.2 parts of N - methyl-N-$\beta$-ethanolmethacrylamide were treated with 4.2 parts of boron trifluoride etherate in the presence of 8.85 parts of methylene chloride. There was sufficient methylene chloride to dissolve the monomeric amide-boron trifluoride complex which formed. The solution was permitted to stand for 48 hours at room temperature. A gelatinous water-insoluble polymer formed.

Example 7

2.9 parts of N - methyl-N-$\beta$-ethanolmethacrylamide were treated with 4.25 parts of boron trifluoride etherate in the absence of methylene chloride. The preparation was permitted to stand at room temperature for 48 hours. A white, water-insoluble polymer formed.

Example 8

To a solution of equal volumes of N-methyl-N-ethanolmethacrylamide and methylene chloride was added an equal volume of boron trifluoride etherate and the resulting solution was irradiated at room temperature with ultra-violet light. A white, water-insoluble polymer which precipitated from the solution was obtained after 24 hours. The polymer was washed with an ammonia solution.

Example 9

The procedure in Example 8 was repeated with chloroform instead of methylene chloride. A similar polymer was obtained.

Example 10

20 parts of N-methyl-N-$\beta$-ethanolacrylamide were treated with 30 parts of boron trifluoride etherate in the presence of 100 parts of methylene chloride and the resulting solution of monomerboron trifluoride complex irradiated at room temperature for 12 hours. A water-insoluble polymer was obtained.

When the N-disubstituted-α-substituted acrylamides are treated with the Friedel-Crafts halides in what would normally be regarded as "catalytic" amounts, that is, in the amounts in which catalysts are normally utilized, no polymerization occurs. Thus:

In 0.35 part of methylene chloride there was dissolved 3.10 parts of N-methyl-N-ethanolmethacrylamide and 0.20 part of boron trifluoride etherate. After 48 hours at room temperature no appreciable change occurred in the monomer.

Likewise 2.85 parts of N-diethylmethacrylamide was treated with 0.20 part of boron trifluoride etherate and 7 parts of methylene chloride and subjected to ultra-violet light at room temperature for 96 hours. The monomer remained unchanged.

N - methyl - N-ethanolmethacrylamide monomer may be prepared by reacting one mol of methacrylyl chloride with two mols of N-methylethanolamine in the presence of acetonitrile. N-methyl-ethanolamine hydrogen chloride precipitates and the solution of N-methyl-N-ethanolmethacrylamide is separated therefrom by filtration. The monomer is then recovered by distillation. The process of preparing the monomer forms the subject matter of my co-pending application Serial No. 622,702, filed on October 16, 1945.

In general, my process is applicable to the formation of monomer-halide complexes from acrylamides having the following formula and to the polymerization of such complexes:

$$H_2C=C-C-N\begin{matrix}R_1\\R_2\end{matrix}$$
$$\begin{matrix}R & O\end{matrix}$$

wherein R is hydrogen; alkyl, such as methyl, ethyl, propyl, isopropyl, butyl; aryl, such as phenyl; cyclohexyl, methylcyclohexyl, methylphenyl; or halogen, such as chlorine; $R_1$ is an aliphatic or alkyl radical, such as methyl, ethyl, etc.; alkylol, such as —$C_2H_4OH$, —$C_3H_6OH$; cycloaliphatic, such as cyclohexyl; aryl, such as phenyl; or aralkyl, such as benzyl. $R_2$ is hydrogen; alkyl, such as methyl, ethyl, etc.; alkylol, such as —$C_2H_4OH$, —$C_3H_6OH$; cycloaliphatic, such as cyclohexyl; aralkyl, such as benzyl; or aryl, such as phenyl. $R_1$ and $R_2$ taken together with the N atom may also represent a heterocyclic group, such as piperidine or morpholine. However, my process is highly effective when utilized in the polymerization of compounds in which R is substituted by alkyl, aryl, or cycloaliphatic; and in which $R_1$ and $R_2$ are both substituted by aryl, aralkyl aliphatic, alkyl or hydroxy alkyl radicals. In this case, $R_1$ and $R_2$ may be alike or dissimilar as, for example, $R_1$ may be ethyl, methyl, or propyl and $R_2$ may be an alkylol, e. g. —$C_2H_4OH$, —$C_3H_6OH$. While the invention has its greatest advantages when applied to the polymerization of these compounds, it may be applied in the polymerization of acrylamides in general or monomers having an amino or N-substituted amino group.

The temperature of polymerization may be varied within any desirable limits. It may be carried out at room temperature or below or at higher temperatures, as, for example, 100° C. In general, it has been found that carrying out the reaction at room temperature is highly effective for producing a polymer. The Friedel-Crafts halide, such as the boron trifluoride, present in the polymer complex formed by polymerization of the monomer-complex, can be removed from the former by washing with ammonia, thus yielding the free polymer. It is preferred to use the Friedel-Crafts halide in equimolecular amounts, and by using a slight excess over this, preferably from 0.1–10%, polymerization can be carried out without use of any other catalyst or ultra-violet light.

The polymers obtained by my process may be utilized for coatings which are highly resistant to water. They may be also molded and shaped and machined to any desired form.

The above detailed description and examples are merely by way of illustration and it is to be understood that any modification or variation therefrom which comes within the spirit of the invention is intended to be included within the scope of the claims.

I claim:

1. The method which comprises catalytically polymerizing a monomer-halide complex obtained by treating a monomeric N-disubstituted amide of the class consisting of N-methyl-N-β-ethanolacrylamide and α-substituted acrylamides having the formula:

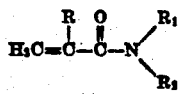

wherein R represents a member of the class consisting of halogen, alkyl, and aryl radicals, and wherein the nitrogen substituents represented by $R_1$, $R_2$ are radicals of the class consisting of monovalent alkyl, alkylol, cycloaliphatic, aralkyl and aryl radicals, and the divalent pentamethylene and oxydiethylene radicals, which, with the N-atom, form piperidyl and morpholinyl radicals, respectively, with a Friedel-Crafts halide to form a complex of the halide with said monomer, such polymerization forming a halide-polymer complex which yields a polymer of said amide upon washing with ammonia solution.

2. A process as defined in claim 1, wherein said monomer-halide complex is obtained by treating said monomeric amide with at least an equimolecular amount of said Friedel-Crafts halide.

3. A process as defined in claim 2, wherein said Friedel-Crafts halide is boron trifluoride.

4. A process as defined in claim 2, wherein said monomeric amide is N-methyl-N-β-ethanolmethacrylamide and said Friedel-Crafts halide is boron trifluoride.

5. A process as defined in claim 2, wherein said monomeric amide is N-diethylmethacrylamide and said Friedel-Crafts halide is boron trifluoride.

6. A process as defined in claim 2, wherein said monomeric amide is N-methyl-N-β-ethanolacrylamide and said Friedel-Crafts halide is boron trifluoride.

7. A process as defined in claim 1, wherein said monomer-halide complex is obtained by treating said monomeric amide with an amount in excess of an equimolecular amount of said Friedel-Crafts halide, and the excess halide serves as the polymerization catalyst.

8. A method of preparing a polymer of an N-disubstituted amide of the class consisting of N-methyl-N-β-ethanolacrylamide and α-substituted acrylamides having the formula:

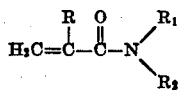

wherein R represents a member of the class consisting of halogen, alkyl, and aryl radicals, and wherein the nitrogen substituents represented by $R_1$, $R_2$ are radicals of the class consisting of monovalent alkyl, alkylol, cycloaliphatic, aralkyl and aryl radicals, and the divalent pentamethylene and oxydiethylene radicals, which, with the N-atom, form piperidyl and morpholinyl radicals, respectively, which method comprises catalytically polymerizing a monomer-halide complex, obtained by treating a monomeric N-disubstituted amide of the aforesaid class with an at least equimolecular amount of a Friedel-Crafts halide, and washing the resulting halide-polymer complex with ammonia solution to remove the halide from the polymer.

GIFFIN D. JONES.

REFERENCES CITED

The following references are of record in the file of this patent:

UNITED STATES PATENTS

| Number | Name | Date |
|---|---|---|
| 1,990,453 | Hund et al. | Feb. 5, 1935 |
| 2,017,537 | Hoffman et al. | Oct. 15, 1935 |
| 2,129,694 | Izard | Sept. 13, 1938 |
| 2,238,928 | Cahn et al. | Apr. 22, 1941 |
| 2,311,548 | Jacobson et al. | Feb. 16, 1943 |

FOREIGN PATENTS

| Number | Country | Date |
|---|---|---|
| 447,750 | Belgium | Nov. 30, 1942 |
| 450,692 | Great Britain | July 23, 1936 |

OTHER REFERENCES

Bowlus et al., "Jour. Am. Chem. Soc.," vol. 53, pages 3835–3840, October 1931.

Abstract in "Chemical Abstracts," vol. 39, p. 1000.

Brown et al., "Jour. Am. Chem. Soc.," vol. 64 (1942), pp. 326 and 328.